(12) United States Patent
Collins et al.

(10) Patent No.: US 10,626,203 B2
(45) Date of Patent: Apr. 21, 2020

(54) PARTICULATE POLYVINYL ALCOHOL, PROCESS FOR MAKING AND USES OF THE SAME

(71) Applicant: KURARAY CO., LTD., Kurashiki-shi (JP)

(72) Inventors: Michael Collins, La Porte, TX (US); Ghebrehiwet Ghebremeskel, La Porte, TX (US); Masaki Kato, La Porte, TX (US); Keisuke Morikawa, Kurashiki (JP); Yoriko Imaoka, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 16/139,312

(22) Filed: Sep. 24, 2018

(65) Prior Publication Data

US 2019/0023825 A1 Jan. 24, 2019

Related U.S. Application Data

(62) Division of application No. 15/440,718, filed on Feb. 23, 2017, now Pat. No. 10,125,204.

(Continued)

(51) Int. Cl.
| | |
|---|---|
| *C08F 16/06* | (2006.01) |
| *C08F 8/12* | (2006.01) |
| *C08L 29/04* | (2006.01) |
| *C08F 216/06* | (2006.01) |
| *C08J 3/12* | (2006.01) |
| *C09D 129/04* | (2006.01) |
| *D21H 19/60* | (2006.01) |
| *C08F 6/02* | (2006.01) |

(Continued)

(52) U.S. Cl.
CPC .............. *C08F 216/06* (2013.01); *C08F 8/12* (2013.01); *C08J 3/12* (2013.01); *C09D 129/04* (2013.01); *D21H 19/60* (2013.01); *C08F 6/008* (2013.01); *C08F 6/02* (2013.01); *C08F 16/06* (2013.01); *C08F 116/06* (2013.01); *C08F 2800/10* (2013.01); *C08J 3/00* (2013.01); *C08J 2329/04* (2013.01); *C08L 29/04* (2013.01)

(58) Field of Classification Search
None
See application file for complete search history.

(56) References Cited

U.S. PATENT DOCUMENTS

| | | | |
|---|---|---|---|
| 3,654,247 A | 4/1972 | Bristol | |
| 9,834,629 B1 * | 12/2017 | Fukuhara | ................. C08F 2/30 |
| 2005/0059778 A1 | 3/2005 | Yanai et al. | |

FOREIGN PATENT DOCUMENTS

| | | |
|---|---|---|
| EP | 0 366 898 A1 | 5/1990 |
| EP | 1 516 889 A1 | 3/2005 |

(Continued)

OTHER PUBLICATIONS

International Search Report and Written Opinion dated Sep. 28, 2017 in PCT/US2017/019637.

(Continued)

*Primary Examiner* — Richard A Huhn
(74) *Attorney, Agent, or Firm* — Oblon, McClelland, Maier & Neustadt, L.L.P.

(57) ABSTRACT

The present invention relates generally to a polyvinyl alcohol composition having higher amorphous polyvinyl alcohol polymer content and various end uses thereof.

5 Claims, 4 Drawing Sheets

Related U.S. Application Data

(60) Provisional application No. 62/305,383, filed on Mar. 8, 2016, provisional application No. 62/448,158, filed on Jan. 19, 2017.

(51) Int. Cl.
*C08F 6/00* (2006.01)
*C08F 116/06* (2006.01)
*C08J 3/00* (2006.01)

(56) References Cited

FOREIGN PATENT DOCUMENTS

| GB | 1 213 751 A | 11/1970 |
| WO | WO 2008/036307 A2 | 3/2008 |
| WO | WO 2008/036307 A3 | 3/2008 |

OTHER PUBLICATIONS

Extended European Search Report dated Aug. 7, 2019 in Patent Application No. 19169278.9, 6 pages.

* cited by examiner

PARTICULATE POLYVINYL ALCOHOL, PROCESS FOR MAKING AND USES OF THE SAME

CROSS REFERENCE TO RELATED APPLICATIONS

This application is a divisional application of prior U.S. application Ser. No. 15/440,718, filed Feb. 23, 2017, the disclosures of which are incorporated by reference herein for all purposes as if fully set forth. U.S. Ser. No. 15/440,718 claims priority under 35 U.S.C. § 119 from U.S. Provisional Application Ser. Nos. 62/305,383 (filed 8 Mar. 2016) and 62/448,158 (filed 19 Jan. 2017), the disclosures of which are incorporated by reference herein for all purposes as if fully set forth.

FIELD OF THE INVENTION

The present invention relates generally to a polyvinyl alcohol composition having higher amorphous polyvinyl alcohol polymer content, a process for making such a polyvinyl alcohol composition, and various end uses thereof.

Particularly, the polyvinyl alcohol composition comprises particulate agglomerates of polyvinyl alcohol particles of higher amorphous content, which can be produced by "thermally" treating polyvinyl alcohol, resulting from the slurry alcoholysis of polyvinyl acetate, at reduced temperatures to control the balance between amorphous and crystalline polyvinyl alcohol content. The polyvinyl alcohol composition in accordance with the present invention comprises such particulate polyvinyl alcohol agglomerates having the unique morphology and surface area properties of slurry alcoholysis-made polyvinyl alcohol, but different bulk density, warm-water solubility and swelling volume as compared to conventional thermally-treated particulate polyvinyl alcohol agglomerates.

The polyvinyl alcohol composition in accordance with the present invention can be utilized, for example, in adhesive compositions, in paper coating compositions, as emulsion stabilizers, in pulp and for various fiber end uses.

BACKGROUND OF THE INVENTION

Polyvinyl alcohol is a well-known polymer and is generally commercially available in many forms for a variety of end uses.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis methods are well known and can be used for this purpose.

The present invention relates to polyvinyl alcohol generated by the slurry alcoholysis of vinyl acetate, which produces vinyl alcohol particulates of unique morphology due to the conditions maintained during the alcoholysis, as discussed below. Properties and applications of various polyvinyl alcohols (hydrolyzed polyvinyl acetates) produced by the slurry alcoholysis process are in a general sense known.

Polyvinyl acetate, the starting material for polyvinyl alcohol, is commercially produced by the free radical polymerization of the vinyl acetate monomer in the presence of a polymerization catalyst. The solvent commonly used in the commercial polymerization of vinyl acetate is methanol.

The polymerization is conducted in the temperature range of 10° C. to 80° C. The lower end of the polymerization range is known to give products with improved properties. The percent conversion of vinyl acetate to polyvinyl acetate can vary over a wide range. Though conversions ranging from 20% to 100% have been found satisfactory, commercially at least about 30% conversion is preferable. The degree of polymerization of polyvinyl acetate varies anywhere from about 400 to about 10000.

The alcoholysis of the polyvinyl acetate to polyvinyl alcohol is typically performed in methanol in the presence of an alkali catalyst such as sodium hydroxide or sodium methylate, such as disclosed in U.S. Pat. No. 2,734,048. The major products of the alcoholysis reaction are polyvinyl alcohol and methyl acetate.

The alkali catalyzed alcoholysis of methanol solutions of polyvinyl acetate is typically conducted at temperatures between about 55° C. to about 70° C. In this temperature range, three distinct phases occur successively as the alcoholysis reaction proceeds. Starting as a homogeneous solution the solubility of the polyvinyl acetate in methanol decreases as increasing numbers of acetate groups are converted to hydroxyl groups. When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down finely divided solid insoluble in the alcohol. The collapsing gel traps and sticks together with the fine particles from the previous alcoholysis cycle producing polyvinyl alcohol of a unique morphology. The unique morphology is a "popcorn" type particle made up of agglomerates of individual polyvinyl alcohol particles, such as shown in FIG. 1, as compared to particles made by other conventional processes, such as shown in FIG. 2.

Ultimately, the polyvinyl alcohol produced is not soluble in the methanol and methyl acetate solvent system and is obtained as a slurry.

Once the desired degree of alcoholysis (hydrolysis) is attained, the catalyst is neutralized with an acid such as acetic acid. The degree of hydrolysis refers to the percentage of acetate groups that are converted to hydroxyl groups. For most commercial polyvinyl alcohol, the degree of hydrolysis varies from 70% to about 100% (maximum).

Many of the important uses of polyvinyl alcohols are in the form of aqueous solutions; however, preparation of an aqueous solution, particularly at high concentration, can be challenging. Slurrying the polyvinyl alcohol in water at room temperatures and then heating the slurry to the temperature necessary to achieve the dissolution of the polymer is a common way of doing so. Polyvinyl alcohols with a degree of hydrolysis greater than 98% are relatively insoluble in water at temperatures below 70° C. and the characteristics of their room temperature water slurry can vary considerably depending on the conditions maintained during the alcoholysis of the parent polyvinyl acetate and the heat history applied to the polyvinyl alcohol. Polyvinyl alcohols which are 70-90% alcoholyzed are generally soluble in water at room temperature and are, consequently, difficult to slurry in water at room temperature.

In order to improve the cold-water slurrying properties of highly-hydrolyzed polyvinyl alcohols produced by an alcoholysis process such as disclosed in U.S. Pat. No. 2,734,048, U.S. Pat. No. 3,497,487 and U.S. Pat. No. 3,654,247 teach to heat treat such polyvinyl alcohols in specific liquid media.

As disclosed in U.S. Pat. No. 3,497,487, the media is a preferably an anhydrous 2-20% solution of acetic acid in a solvent comprising one or both of methanol and methyl acetate. A particulate polyvinyl alcohol is dispersed in the media and heated to a temperature of generally 50-150° C. (preferably from the atmospheric reflux temperature of the mixture up to 140° C.) for a time dependent upon the temperature (higher temperatures require shorter times).

As disclosed in U.S. Pat. No. 3,654,247, the media is methanol and optionally small amount of water and/or a 2-5 carbon atom alcohol, ester, ketone, ether, or certain other specified types of hydrocarbons. A polyvinyl alcohol slurry is mixed with other components to form the desired media, then heated to a temperature of generally 70-190° C. (preferably from 90-150° C.) for a time dependent upon the temperature (higher temperatures require shorter times).

In commercial continuous slurry alcoholysis processes to produce highly-hydrolyzed polyvinyl alcohol, this heat treatment is present and performed by pumping the neutralized polyvinyl alcohol slurry to a heat treatment vessel, where it is typically heated at temperatures of 110° C. or greater.

From the heat treatment vessel, the slurry is cooled and the polymer is separated from the methanol/methyl acetate solvent system to generate a polyvinyl alcohol cake. The polyvinyl alcohol cake is then typically washed with methanol to reduce ash content and other contaminants (purified), then the resulting polyvinyl alcohol particles are filtered and dried to a particulate product which is desirably a free-flowing powder.

This ultimately results in a highly crystalline polyvinyl alcohol product having certain particle size, surface area and bulk density, low warm-water solubility and low swelling volume properties.

There are, however, some desired end-use applications where the low warm-water solubility of these highly-crystalline polyvinyl alcohols are disadvantageous, for example, in certain adhesive, paper coating, emulsion stabilizer, pulp and various fiber end-uses.

It would, therefore, be desirable to provide a substantially fully-hydrolyzed polyvinyl alcohol that has low cold water solubility so that slurries can be prepared, but good warm water solubility to ease the formation of aqueous solutions, as well as a continuous process for producing such substantially fully-hydrolyzed polyvinyl alcohols that can be operated commercially.

SUMMARY OF THE INVENTION

In a first aspect, the invention provides a process for preparing a polyvinyl alcohol composition of particulate agglomerated polyvinyl alcohol particles, comprising the steps of:

providing to an alcoholysis unit (i) a solution of a polyvinyl acetate in a solvent and (ii) an alkali catalyst;

combining the solution and the alkali catalyst in the alcoholysis unit under agitation to hydrolyze the polyvinyl acetate to produce a first slurry comprising (i) a polyvinyl alcohol having a degree of hydrolysis of about 93% or greater and (ii) residual alkali catalyst;

removing the first slurry from the alcoholysis unit;

feeding to a neutralization unit (i) the first slurry and (ii) an acid;

combining the first slurry with the acid in the neutralization unit to neutralize the residual alkali catalyst and produce a second slurry comprising the polyvinyl alcohol;

removing the second slurry from the neutralization unit;

feeding the second slurry removed from the neutralization unit to a thermal treating unit;

thermally treating the second slurry in the thermal treating unit;

separating polyvinyl alcohol from the second slurry to produce a polyvinyl alcohol wet cake; and drying the polyvinyl alcohol wet cake to produce the particulate agglomerated polyvinyl alcohol particles, wherein (1) the second slurry is removed from the neutralization unit at a first temperature; and (2) in the thermally treating step, the temperature of the second slurry is reduced to less than the first temperature.

In a second aspect, the present invention provides a polyvinyl alcohol composition prepared by the above process.

In a third aspect, the present invention provides a polyvinyl alcohol composition of particulate agglomerated polyvinyl alcohol particles, wherein:

(1) the polyvinyl alcohol is a polymer of a monomer component consisting essentially of vinyl acetate and, optionally, up to about 10 mol % of one or more acrylate monomers, with a degree polymerization of from about 400 to about 10000, and a degree of hydrolysis of about 93% or greater; and (2) the composition has a D(90) particle size of from about 1 μm to about 1000 μm, a bulk density of about 50 g/cm3 or greater, and a warm-water (35° C.) solubles of about 5% or greater.

In a fourth aspect, the present invention provides a polyvinyl alcohol composition produced in a slurry alcoholysis process with a heat treatment step, wherein the polyvinyl alcohol is produced at 50° C. or less in the heat treatment step and has a crystallinity reduced by about 2% to about 20% as compared to a polyvinyl alcohol produced under the same conditions except at 135° C., or except at 110° C., in the heat treatment step.

The lower heat treatment temperature has been found to decrease both the percent crystalline content (increase the percent amorphous content) and the crystalline sizes while maintaining the overall agglomerated shape (popcorn-ball morphology).

The present invention, therefore, discloses a process for producing a highly-hydrolyzed polyvinyl alcohol by the slurry alcoholysis process with properties which include: "popcorn ball" morphology, lower percent crystallinity, higher warm-water solubles and higher swelling volume. Polyvinyl alcohols with such properties can be utilized in adhesives, paper coating, emulsion stabilizers, inorganic substances, pulp and various fiber end uses, but it is by no means limited to such uses.

In a fifth aspect, the present invention provides an aqueous solution comprising the polyvinyl alcohol composition substantially dissolved in water, or dissolved in water. Such aqueous solutions find use in a variety of paper processing applications, such as in paper coating compositions and inner sizing compositions.

These and other embodiments, features and advantages of the present invention will be more readily understood by those of ordinary skill in the art from a reading of the following detailed description.

DETAILED DESCRIPTION

Figure 1A:
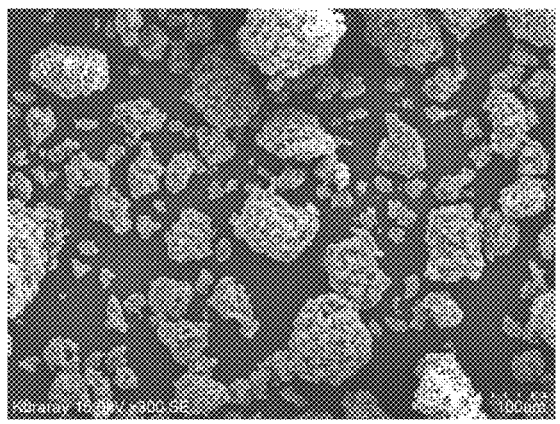
FIGS. 1A and 1B are scanning electron microscope images, at a scale of 100 microns and 50 microns, respectively, of polyvinyl alcohol particulates produced by slurry alcoholysis showing a "popcorn ball" morphology.
Figure 1B:
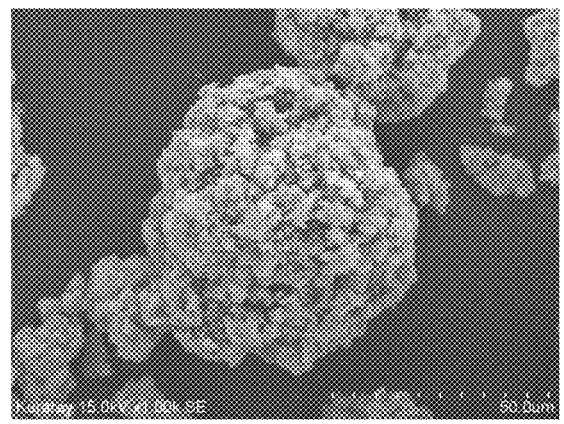
Figure 2A:
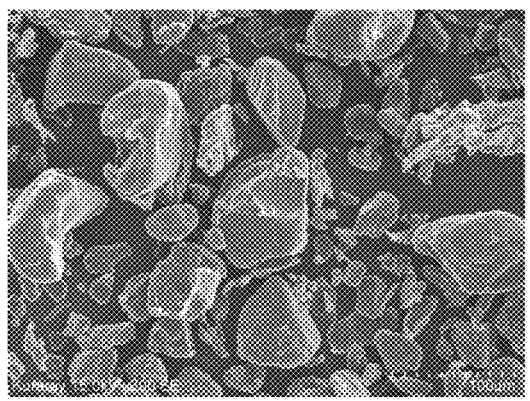
FIGS. 2A and 2B are scanning electron microscope images, at a scale of 100 microns and 50 microns, respectively, of polyvinyl alcohol particulates produced by another type of conventional hydrolysis.
Figure 2B:
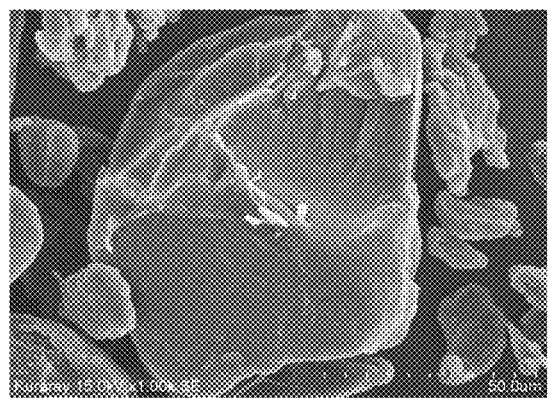

The present invention relates to a polyvinyl alcohol product, a process for preparing such polyvinyl alcohol product and for various end uses of such polyvinyl alcohol product. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump) due to moisture content, as is well understood by those of ordinary skill in the relevant art. Free-flowing particles need not be "dry" but, desirably, the moisture content of the particles is substantially internally contained so that there is minimal (or no) surface moisture.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Production Process

In accordance with the present invention, polyvinyl alcohol is produced by an alcoholysis process in which polyvinyl alcohol is obtained from polyvinyl acetate and recovered as a slurry in a methanol and methyl acetate solvent system. The process of the invention is desirably continuous. The alcoholysis process is in a general sense well known to those of ordinary skill in the relevant art, such as disclosed in previously incorporated U.S. Pat. No. 2,734,048. Further details are provided below.

Figure 3:
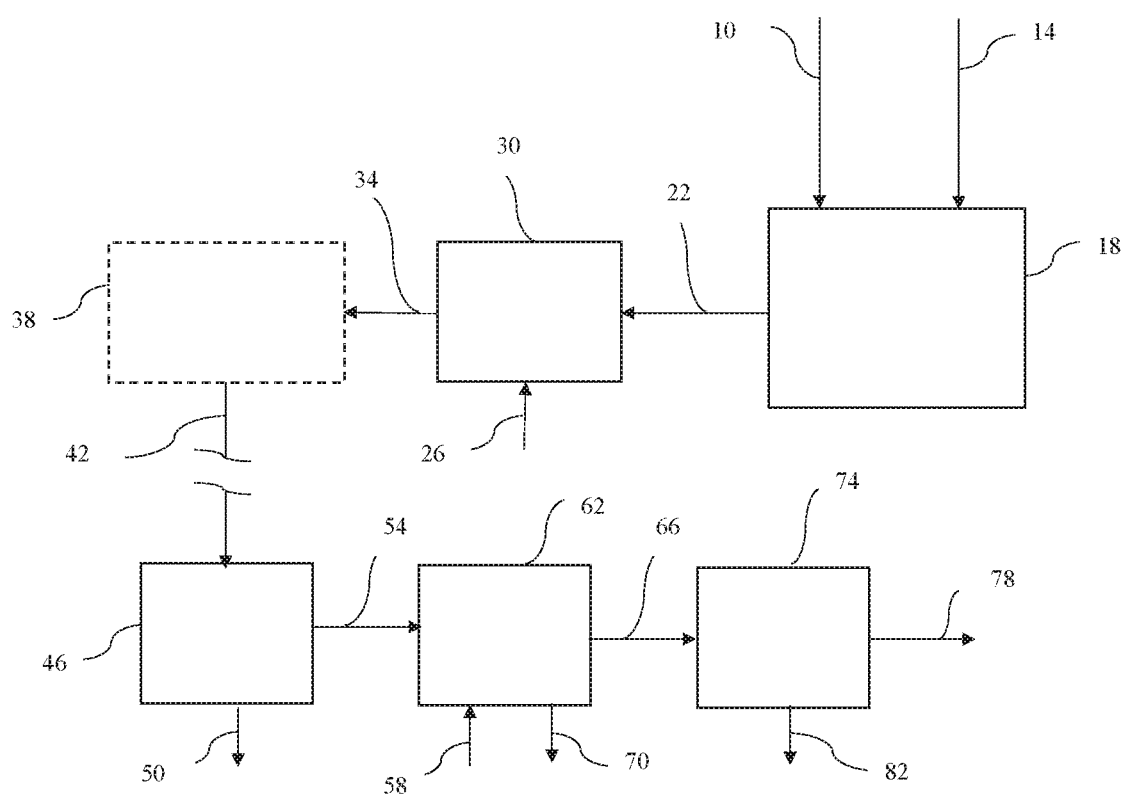
FIG. 3 is a general diagram of a process in accordance with the present invention.

Referring to FIG. 3, a first solution (10) of typically about 30 wt % to about 60 wt % polyvinyl acetate in methanol, and a second solution (14) of dilute sodium methylate alcoholysis catalyst in methanol, are continuously fed to an alcoholysis unit (18) wherein the reaction proceeds to produce a first slurry (22) of the alcoholyzed polyvinyl acetate (polyvinyl alcohol) and methyl acetate.

Catalyst amount typically ranges from about 0.2 wt % to about 0.5 wt % based on the weight of the reaction mixture.

The temperature of the alcoholysis reaction in alcoholysis unit (18) is typically from about 58° C., or from about 64° C., to about 70° C., or to about 68° C. The pressure within alcoholysis unit (18) ranges from slightly below atmospheric pressure to slightly above atmospheric pressure, but is typically slightly above atmospheric pressure.

The alcoholysis unit (18) contains an agitation means so that the alcoholysis is at least partially conducted under agitation conditions. Such agitation means are well known to those of ordinary skill in the relevant art.

As discussed previously, when the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of the desired "popcorn ball" morphology.

In one embodiment, the alcoholysis unit (18) is made up of a primary alcoholysis vessel where the reaction proceeds to produce a slurry of partially alcoholyzed polyvinyl acetate. The slurry from the primary alcoholysis vessel overflows to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion.

Preferred conversion is a degree of hydrolysis of about 93% or greater, or about 95% or greater, or about 98% or greater, or about 99% or greater.

The resulting first polyvinyl alcohol slurry (22) is then fed to a neutralizing unit (30) along with an acid (26) to neutralize any excess alkali catalyst. Typically, the acid employed is acetic acid. The temperature entering neutralizing unit (30) is slightly lower than in alcoholysis unit (18), generally in the range of from about 53° C. to about 60° C., and typically in the range from about 55° C. to about 58° C. Pressure conditions in neutralizing unit (30) are typically similar to those in alcoholysis unit (18).

The second slurry (34) resulting from the neutralization reaction is then fed to a thermal treating unit (38). The temperature of second slurry (34) entering thermal treating unit (38) is about 50° C. or greater, and typically about 65° C. or greater, and is reduced in thermal treating unit (38) to less than the temperature entering thermal treating unit (38). Depending on the desired morphology of the final polyvinyl alcohol particulate, the temperature can be reduced to less than 50° C., or to less than 40° C., or to less than 35° C., or to less than 30° C., or to less than 25° C., or to less than ambient conditions, with the lower temperatures resulting in higher amorphous and less crystalline content.

Thermal treatment unit (38) can be a holding tank with mild heating, or no heating or even active cooling so that the temperature of the second slurry is reduced between entry and exit.

In a preferred embodiment, the resulting thermally treated second slurry (42) is fed to a solids-liquid separation unit (46) where polyvinyl alcohol is separated from the slurry to generate a polyvinyl alcohol wet cake (54) and separated liquids (50). The solids-liquid separation unit (46) can be a centrifuge and/or filtration device or other convention solids-liquid separation device.

In an alternate embodiment, the thermal treatment unit (38) and solids-liquid separation unit (46) can be combined in a single unit operation where the residence time of the slurry and solids is sufficient to reduce the temperature of the second slurry to the desired level.

The resulting polyvinyl alcohol wet cake (54) is then desirably purified by feeding the wet cake (54) into a washing unit (62) where it is contacted typically with a fresh or recycled methanol stream (58) to remove ash components and other contaminates (70) to generate a purified polyvinyl alcohol wet cake (66).

In order to generate the particulate agglomerated polyvinyl alcohol particles (78), the purified polyvinyl alcohol wet cake after centrifugation (66) is fed to a drying unit (74) where it is dried via conventional means to remove sufficient remaining liquid content (82) so that the resulting particulate agglomerated polyvinyl alcohol particles (78) can be recovered, preferably as a free-flowing powder.

Additional process details can be had by reference to previously incorporated U.S. Pat. No. 2,734,048, U.S. Pat. No. 3,497,487 and U.S. Pat. No. 3,654,247, as well as general knowledge of those of ordinary skill in the relevant art.

Product Properties

The starting polyvinyl acetates can be vinyl acetate homopolymers, or copolymers of a predominant amount of vinyl acetate with minor amounts of one more acrylate or lower alkyl acrylate monomers. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers include methyl acrylate, methyl methacylate and mixtures thereof.

When present, the comonomers are typically used in amounts of 10 mol % or less, or 5 mol % or less, based on the total moles of monomer.

The polyvinyl acetates will generally have an average degree of polymerization of from about 400 to about 10000, and more typically from about 400 to about 2000.

The resulting polyvinyl alcohols, of course, will have substantially the same monomer makeup and degree of polymerization as the starting polyvinyl acetates.

As indicated above, the polyvinyl alcohol preferably has a degree of hydrolysis of about 93% or greater, or about 95% or greater, or about 98% or greater, or about 99% or greater.

D(90) particles sizes of the polyvinyl alcohol agglomerated particles in accordance with the present invention range from about 1 μm, or from about 10 μm, to about 1000 μm, or to about 400 μm.

Bulk density of the composition in accordance with the present invention is preferably 50 g/cm3 or greater, and more preferably about 55 g/cm$^3$ or greater.

The polyvinyl alcohol particles in accordance with the present invention preferably have a % warm-water solubles, measured as described in the examples below, of about 5% or greater, or of about 7.5% or greater, or of about 10% or greater.

The polyvinyl alcohol particles in accordance with the present invention preferably have a swelling degree, measured as described in the examples below, of about 200% or greater, or about 250% or greater.

The polyvinyl alcohol agglomerated particles in accordance with the present invention also have a reduced crystallinity/higher amorphous content than the conventional heat treated version. In one embodiment, a polyvinyl alcohol produced at 50° C. or less in the heat treatment step has a crystallinity reduced by about 2% to about 20% as compared to a polyvinyl alcohol produced under the same conditions except at 135° C., or except at 110° C., in the heat treatment step.

Application for Paper Processing

The polyvinyl alcohol particles in accordance with the present invention dissolve completely in a short period of time compared to conventional polyvinyl alcohols, making them suitable for the production of aqueous solutions.

For example, the polyvinyl alcohol particles are suitable for rapid heating dissolving processes by using, for example, a device combining a slurry of polyvinyl alcohol particles and steam, such as a jet cooker device.

Such aqueous solutions can be used for paper processing, for example, as a paper inner sizing composition, a paper coating composition and so on.

The paper may include general paper, pigment coated paper (art paper, coated paper, cast-coated paper), synthetic paper and the like.

A paper coating composition comprising the aqueous solution for paper processing can be coated on a surface of a paper using a size press, an air knife coater, a roll coater, a bar coater, a blade coater, a curtain coater, a cast coater, and the like that are conventionally known. Here, although the coating temperature (temperature of the paper coating composition) is not particularly limited, it is preferably not less than about 10° C. and not more than about 60° C.

As a paper inner sizing composition, it is possible to internally add the aqueous solution when making paper.

The polyvinyl alcohol content in the aqueous solution used for producing paper processing is not particularly limited and is selected arbitrarily depending on the amount of coating (increased amount in dry weight of the paper caused by coating), the device used for coating, the operating conditions, and the like. Typically, polyvinyl alcohol content is not less than about 1 wt %, or not less than about 2 wt %, and not more than about 15 wt %, or not more than about 10 wt %, based on the total weight of the aqueous solution.

The same concentration is preferable also when the aqueous solution is used as a paper inner sizing composition.

EXAMPLES

The invention will be further understood from the following specific examples of the properties of the polymer. However, it will be understood that these examples are not to be construed as limiting the scope of the present invention in any manner.

Measurement of Melting Point:

The thermal transition behavior was determined by Differential Scanning Calorimeter model TA Instrument DSCQ2000 from 20° C. to 300° C. A heating rate of 200° C./min was used under a nitrogen atmosphere and at a flow rate of 50 ml/min. The sample size used was 1.2-1.3 mg. ΔH is the enthalpy of fusion at the melting point, Tm.

Measurement of % Crystallinity:

The X-ray diffraction (XRD) measurements of the samples were recorded with a Rigaku Smart Lab. The following experimental conditions were used: Detector: Scintillation counter, SC-70, Scan axis: 2θ/θ, scan range: 2θ=5~80 deg, step size: 0.02 deg, current: 200 mA, voltage: 45 kV, soller/PSC: 5.0 deg, IS longitudinal slit: 5.0 deg, IS: 1 mm and RS2:2 0 mm.

Warm-Water Solubles (WWS) Measurement:

All warm-water solubles percentage values reported herein were determined as follows: A mixture of 20 g of the polyvinyl alcohol in particulate form and 180 g of distilled water was agitated at 35° C. with a triple bladed stirrer running at 200 rpm for 15 minutes, with water being added to maintain the total weight of the slurry at 200 g. An aliquot of the slurry was then transferred to a 40 ml centrifuge bottle and centrifuged at 1500 rpm for 10 minutes. An aliquot of the resulting supernatant liquid was evaporated to dryness and the WWS content is calculated as follows:

% WWS=(Wt. of solid in aliquot*200)/(Wt. of aliquot*20)*100

Measurement of Pore Size and Pore Surface Area:

The pore size and pore surface area were measured by the mercury press-in method using a porosimeter (Autopore 950; manufactured by Shimadzu Corporation). The specific surface areas were calculated based on nitrogen absorption/desorption isotherms. An initial pressure: 2.5 kPa, cell size of 5 cc and a sample size of 0.16 g was employed.

The examples below illustrate that lowering the heat treatment temperature lowers the crystallinity and crystalline sizes for both the unmodified and modified (methyl acrylate and methyl methacrylate) polyvinyl alcohol.

Sample C1 was a fully-hydrolyzed polyvinyl alcohol prepared from polyvinyl acetate homopolymer utilizing the commercial process described above with heat treatment by adding heat to raise temperature from about 50° C. to about 110° C.

For Sample 1, 350 g of polyvinyl alcohol slurry in methanol was obtained from the neutralized tank of the commercial process before the polymer was subjected to heat treatment (no heat added). The pH of the slurry was 5.3. The sample was placed in a 4-liter glass jar fitted with a three-blade glass agitator. Approximately 1000 mL of methanol was added to the sample and the mixture was continuously agitated. The product was maintained at room temperature. The product was discharged from the flask after a residence time of about 30 minutes. The polymer obtained was then filtered using cheesecloth. The procedure was repeated twice to get rid of impurities. The product was then dried in a vacuum oven at 50° C. overnight. The polyvinyl alcohol obtained was a white, granular polymer having degree hydrolysis of 99.7%. The yellowness index of the sample was 2.53. The % ash was 0.3%. The viscosity of the sample was 31.5 cps (4% solids aqueous solution at 20° C. determined by Hoeppler falling ball method). The dry product was screen tested to determine its particle size distribution. The results are tabulated below:

| Screen Fractions (U.S. Sieve Scale) | Percent |
|---|---|
| 10 mesh | 0.0 |
| 40 mesh | 2.9 |
| 100 mesh | 27.7 |
| 200 mesh | 36.0 |
| 325 mesh | 19.0 |
| Pan | 14.4 |

Sample C2 was polyvinyl alcohol copolymer prepared on a commercial line by the copolymerization of vinyl acetate with methyl methacrylate (MMA), followed by the hydrolysis of the vinyl acetate copolymer to the vinyl alcohol copolymer with heat treatment as described above. The polyvinyl alcohol copolymer of the present invention comprised from at least 1 mol % to 10 mol % methyl methacrylate (MMA). The polyvinyl acetate groups were completely hydrolyzed using sodium methylate as a catalyst.

For Sample 2, 350 grams of the methanol slurry of the copolymer was collected from the neutralization tank prior to the heat treatment step (no heat added). The pH of the slurry was 5.5. The sample was placed in a 4 liter glass jar fitted with a three-blade glass agitator. 1000 mL of methanol was added to the sample and the mixture was continuously agitated. The product was maintained at room temperature. The product was discharged from the flask after a residence time of about 30 minutes. The polymer obtained was then filtered using cheesecloth. The procedure was repeated twice to get rid of impurities. The product was then dried in a vacuum oven at 50° C. overnight. The polyvinyl alcohol obtained was a white, granular polymer with a degree hydrolysis of 99.7%. The yellowness index of the sample was 4.7. The % ash was 0.44%. The viscosity was determined to be 29.6 cps (4% solids aqueous solution at 20° C. determined by Hoeppler falling ball method).

| Sample | Heat treatment Temperature (° C.) | Co-monomer | Crystallinity (%) | D (100) (Å) | Tm (° C.) | ΔH (J/g) |
|---|---|---|---|---|---|---|
| 1 | No heat added | None | 49.6 | 55 | 225.4 | 63.6 |
| C1 | 110 | None | 52.8 | 58 | 224.3 | 71.3 |
| 2 | No heat added | Methyl Methacrylate | 42.2 | 53 | 209.1 | 46.3 |
| C3 | 110 | Methyl Acrylate | 48.8 | 79 | 201.1 | 41.9 |

Example 2

Example 2 illustrates the pore size, pore surface area and the porosity of the polyvinyl alcohol are significantly decreased when the heat treatment temperature was lowered from 110° C. to 50° C. (no heat added). As the % crystallinity decreased, the swelling degree (vol. %) increased by up to 200% from the original volume.

| Sample | Heat Treatment Temperature (° C.) | Pore Size (mL/g) | Pore Surface Area (m2/g) | Medium Diameter (μm) | Mode Diameter (μm) | Porosity (%) | Swelling Degree (vol. %) |
|---|---|---|---|---|---|---|---|
| C1 | 110 | 1.553 | 18.0 | 25.4 | 41.9 | 66 | 179 |
| 1 | No heat added | 1.367 | 7.14 | 17.1 | 24.4 | 64 | 301 |

Sample C3 was prepared via the same procedure as Sample C2, except that the polyvinyl acetate was a copolymer of vinyl acetate and at least 1 mol % to 10 mol % methyl acrylate.

For Sample 3, 350 g of the sample of the copolymer was collected from the neutralization tank prior to heat treatment step (no heat added) and was placed in a 4 liter glass jar fitted with a three-blade glass agitator. The pH of slurry was 5.7. 1000 mL of methanol was added to the sample and the mixture was continuously agitated. The product was maintained at room temperature. The product was discharged from the flask after a residence time of about 30 minutes. The polymer obtained was then filtered using cheesecloth. The procedure was repeated twice to get rid of impurities. The product was then dried in a vacuum oven at 50° C. overnight. The polymer obtained was a white, granular product having a degree hydrolysis of 99.7%. The % ash was 0.44%. The viscosity was determined to be 20.4 cps (4% solids aqueous solution at 20° C. determined by Hoeppler falling ball method).

Example 1

Example 1 shows structural differences when the heat treatment temperature was lowered from 110° C. to 50° C. (no heat added). Wide Angle X-ray Diffraction (WAXD) analysis showed that the % crystallinity decreased when the heat treatment temperature was lowered from 110° C. to 50° C. The enthalpy of melting (ΔH) of the non-heat treated samples was lower than that of the heat-treated samples.

Example 3

Example 3 illustrates that lowering of the heat treatment temperature from 110° C. to about 50° C. (no heat added) alters the key properties of the polymer. Warm-water solubles increased from under 4% to over 10% when the heat treatment temperature was lowered from 110° C. to 50° C.

| Sample | Heat treatment Temperature (° C.) | Co-monomer | % Warm-Water Solubles |
|---|---|---|---|
| 1 | No heat added | None | 13.8 |
| C1 | 110 | None | 2.1 |
| 2 | No heat added | Methyl Methacrylate | 10.7 |
| C2 | 110 | Methyl Methacrylate | 3.4 |
| 3 | No heat added | Methyl Acrylate | 11.1 |
| C3 | 110 | Methyl Acrylate | 2.0 |

Example 4

Figure 4:
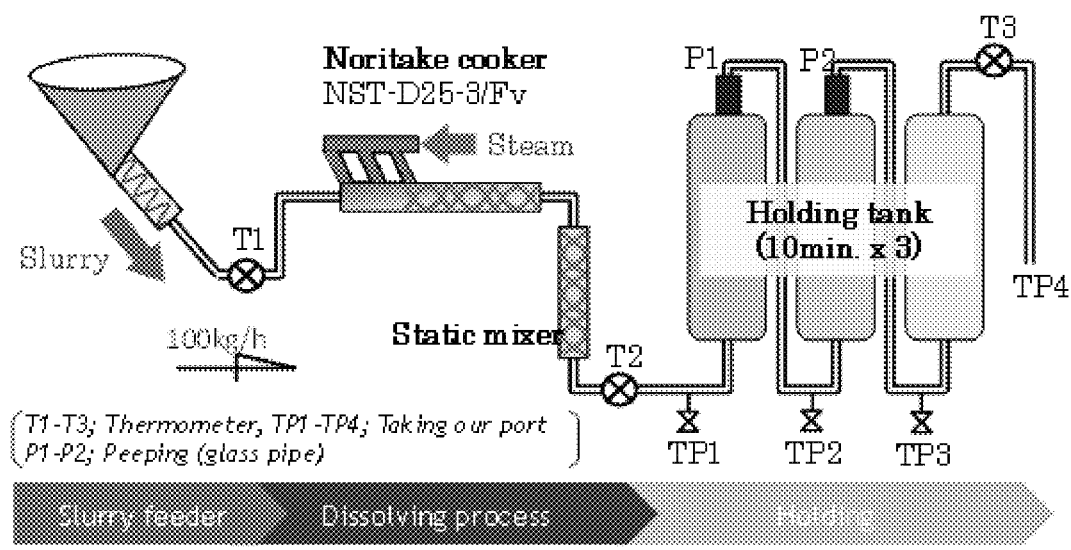
FIG. 4 is a general diagram of a jet cooker device as utilized in the examples as described below.

Process for Preparing an Aqueous Solution for Paper Processing:

An aqueous solution was prepared through a step of combining a slurry of the polyvinyl alcohol particles and a steam in "jet cooker" mixing device (Noritake cooker; NST-D25-e/Fv) as depicted in FIG. 4. The slurry was passed through a static mixer, and held in holding tanks for 30 minutes. Whether the polyvinyl alcohol composition dissolved or not was confirmed by (i) checking the solution's appearance from glass pipes (shown as P1 and P2 in FIG. 4) on the holding tanks, and/or filtrating the solution and checking the amount of residue in a small portion of solutions sampled from taking-out ports (shown as TP1, TP2, TP3 and TP4 in FIG. 4). Test conditions are shown in the following table.

| Flow rate [kg/h] | Concentration [wt %] | | Steam | | Temperature [° C.] | |
|---|---|---|---|---|---|---|
| | Slurry | Target | [MPa] | Valve opening degree[%] | T2 | T3 |
| Ca. 100 | 13.20 | 12.00 | ≤0.15 | 12 | 100 | ≤75 |
| | | | | 21.5 | 120 | ≤110 |
| | | | | 32.0 | 140 | ≤120 |

In the above table, the temperature was controlled by the amount of steam fed into the jet cooker, which was determined by the degree of opening of a valve feeding steam into the jet cooker.

Solubility results are provided in the following table.

| Sample | | | | Solubility | | | |
|---|---|---|---|---|---|---|---|
| | | | | Holding time/ Taking our port | | | |
| Heat treatment Temperature (° C.) | Co-monomer | Temperature (° C.) | 0 min./ TP1 | 10 min./ TP2 | 20 min./ TP3 | 30 min./ TP4 | |
| 1 | No heat added | None | 100 | D | B | A | A |
| | | | 120 | C | A | A | A |
| | | | 140 | B | A | A | A |
| C1 | 110 | None | 100 | D | D | C | C |
| | | | 120 | D | C | B | B |
| | | | 140 | C | B | B | A |
| Kuraray Poval 28-98 | | | 100 | clogging of pipes | | | |

The result in the above table show solubility when using "jet cooker" mixing device. A means "no residue", B means "a little residue", C means "some residue", and D means "much residue".

Sample 1 (from Example 1) shows highest solubility; though there is a small amount of residue remaining just after passing through "jet cooker" mixing device, it may dissolve completely in a short period of time. Actually, under the condition of >120° C., no residues were observed in the solution after 10 min. holding.

Sample C1 (from Example 1) almost dissolves under >140° C. conditions, if the solution is held with the remaining heat for >10 min. When using milder temperature conditions such as 120° C., longer holding times are needed.

On the other hand, virtually all of the Sample 1 solutions after heat removal contained no residues, even at lower temperatures.

Larger particles of "conventional" polyvinyl alcohol (Kuraray Poval 28-98) caused clogging of pipes because of less particle swelling, and results were not obtainable.

Example 5

Preparing a Paper Coating Composition:

10 wt % of polyvinyl alcohol solution prepared by using the jet cooker equipment as described above was diluted with ion-exchange water to 4 wt %.

Measurement of Paper Strength:

The paper coating composition was coated at 2 g/m2 one side on a paper by using Mayer bar. The paper coating composition was then dried at 100° C. for 5 minutes, and after that, was treated at 100 kgf force in 10 m/minutes at 50° C. A piece of paper coating composition (2 cm×20 cm) was provided to a universal printing tester (MPT10C; KUMAGAI RIKI KOGYO CO., LTD.), which measured surface strength of coated side.

| Sample | Heat treatment Temperature (° C.) | Co-monomer | Paper strength (m/s) |
|---|---|---|---|
| 1 | No heat added | None | 11.8 |
| | MS-3800 (Oxidized starch) | | 7.2 |

Example 5 shows surface strength of paper coating composition. The paper coated the paper coating composition of the present invention shows excellent surface tension compared to a paper coated with a conventional oxidized starch.

We claim:

1. A polyvinyl alcohol composition of particulate agglomerated polyvinyl alcohol particles, wherein:
   (1) the polyvinyl alcohol is a hydrolyzed polymer of a monomer component consisting essentially of vinyl acetate and, optionally, up to about 10 mol% of one or more acrylate monomers, with a degree of polymerization of from about 400 to about 10000, and a degree of hydrolysis of about 93% or greater; and
   (2) the particulate agglomerated polyvinyl alcohol particles has a D(90) particle size of from about 1 μm to about 1000 μm and a % warm-water (35° C.) solubles of about 5% or greater.

2. The polyvinyl alcohol composition of claim 1, wherein the polyvinyl alcohol composition is produced in a slurry alcoholysis process with a heat treatment step, and the polyvinyl alcohol is produced at 50° C. or less in the heat treatment step and has a crystallinity reduced by about 2% to about 20% as compared to a polyvinyl alcohol produced under the same conditions except at 135° C. in the heat treatment step.

3. The polyvinyl alcohol composition of claim 2, wherein the polyvinyl alcohol is produced at 50° C. or less in the heat treatment step and has a crystallinity reduced by about 2% to about 20% as compared to a polyvinyl alcohol produced under the same conditions except at 110° C. in the heat treatment step.

4. A composition comprising a solution of the polyvinyl alcohol composition of claim 1 dissolved in water.

5. The composition of claim 4, wherein the composition is a paper inner sizing composition or a paper coating composition.

* * * * *